UNITED STATES PATENT OFFICE.

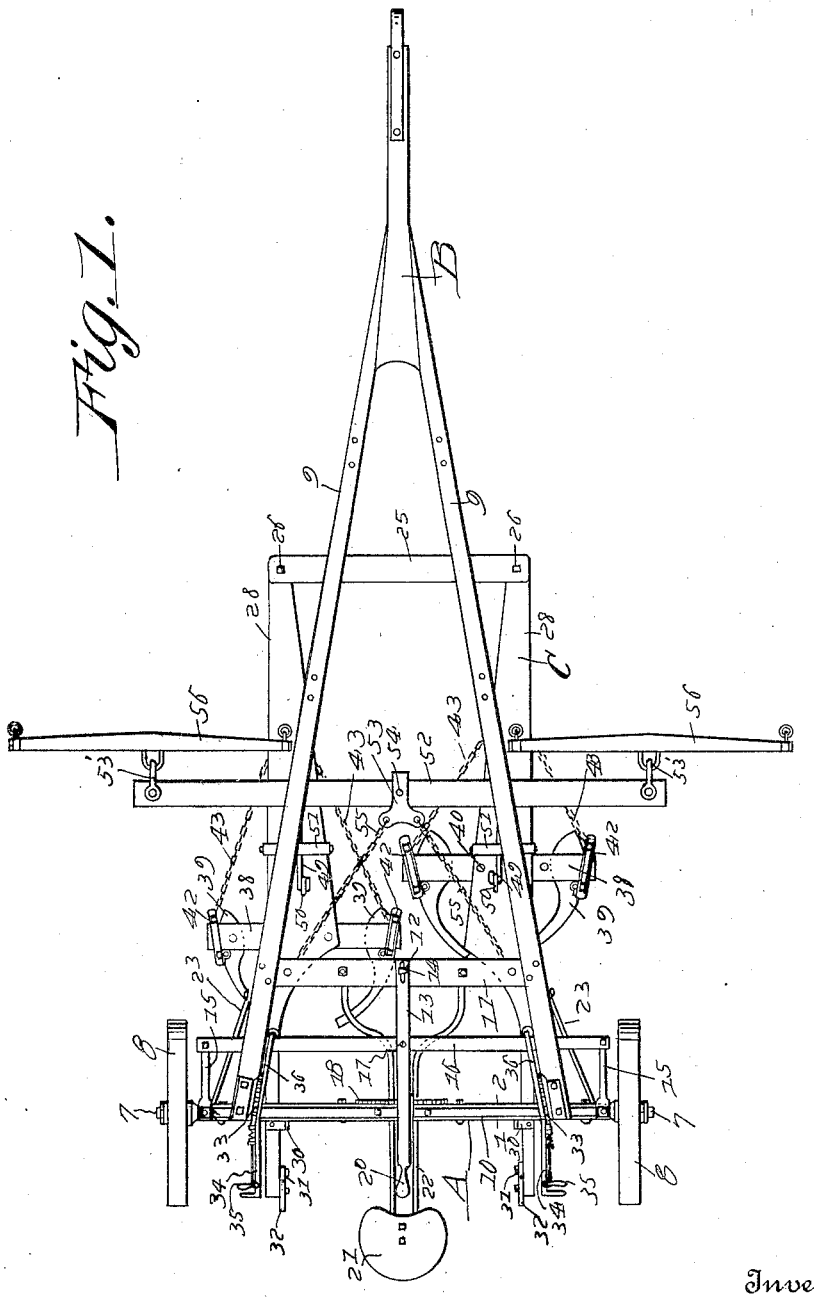

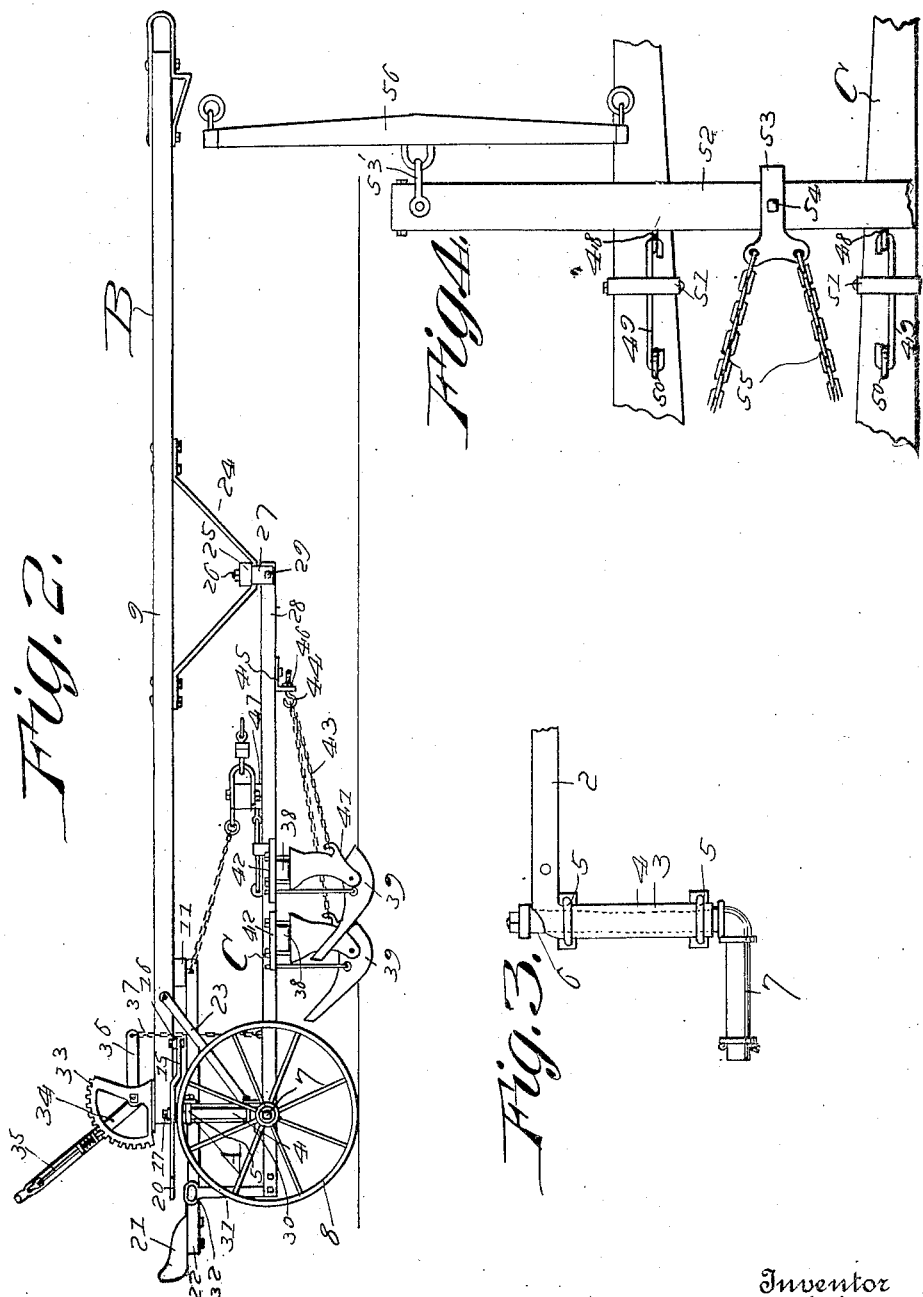

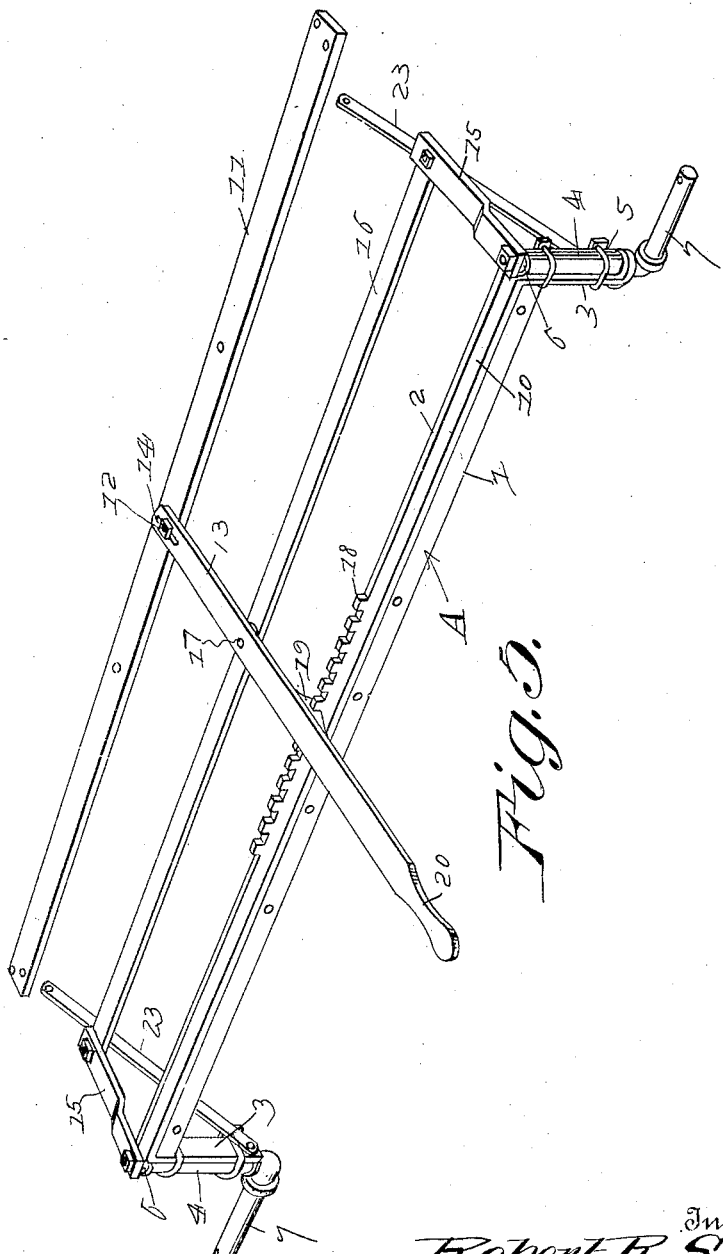

ROBERT R. SLIPP, OF FORT FAIRFIELD, MAINE.

MACHINE-HOE.

1,346,265.   Specification of Letters Patent.   Patented July 13, 1920.

Application filed February 17, 1919. Serial No. 277,544.

*To all whom it may concern:*

Be it known that I, ROBERT R. SLIPP, a citizen of the Dominion of Canada, who declared his intention to become a citizen of the United States and took out first papers July 12, 1917, residing at Fort Fairfield, in the county of Aroostook and State of Maine, have invented new and useful Improvements in Machine-Hoes, of which the following is a specification.

The purpose of the invention is to provide a gang hoe mounted for operation on a suitable mechanism adapted to be drawn by draft animals. The hoes are arranged in pairs and carried on separate beams, each beam being under the control of an operator so that it may be raised or lowered, and the hoes attached to it thereby raised or lowered, or moved laterally in one direction or the other to regulate the distance between different pairs of hoes for the convenient operation in rows spaced different distances apart. The machine is provided with a draft gear directly connected with the hoe beams, and its points with attachment to the latter are at a low level thus making the draft on the machine at a corresponding level with the attendant advantage that it serves to relieve a great part of the weight of the tongue of the device from the draft animals.

The machine is supported on an appropriate frame equipped with ground wheels which are operatively connected together and operatively connected with a hand operating lever by which the axis of the wheel may be changed with respect to the frame so that in the use of the machine on an incline, as on a hillside, the hoes may be made to follow the desired rows. This arrangement is also serviceable in that it permits the hoes to be kept in the rows despite irregularities in the latter.

A further purpose of the invention is the provision of a device of the machine of this character which is simple in construction, durable and effective in operation and inexpensive to manufacture.

Other and further purposes appear in the following description, wherein the invention is set forth in detail.

As shown and described, a specific embodiment of the invention is adhered to, but to this embodiment the invention is not to be restricted. The right is reserved to make such changes or alterations as the actual reduction to practice may suggest, in so far as such changes or alterations are compatible in spirit with the annexed claim.

The same numerals of reference designate the same parts throughout the several figures of the drawings, wherein:

Figure 1 is a top plan view of the improved machine.

Fig. 2 is a side elevational view.

Fig. 3 is a detailed elevational view of one of the stub axles for the ground wheels.

Fig. 4 is a top plan view of a portion of the draft mechanism including the doubletree and a whiffle tree.

Fig. 5 is a perspective view of the frame of the machine.

Referring to the drawings, the invention is shown as comprising a frame generally designated A, a tongue generally designated B, and the hoe mechanism generally designated C.

The frame comprises two spaced parallel rails 1 and 2, these being transversely disposed with reference to the machine as a whole, both rails terminating at each end in a depending plate portion 3. Attached to each of these plates 3 there is an upright tubular member or sleeve 4, the U-shaped clamps 5 being employed for such attachment. These sleeves 4 constitute bearing sleeves in which the upright legs 6 of the stub axles 7 are carried, so that the stub axles may be pivotally mounted for angular movement in a plane at right angles to their axis. Each stub axle, as is usual, carries a ground wheel 8, the two serving to support the frame A.

The tongue B is formed with two diverging legs 9 the ends of which are secured to a bar 10 carried between the rails 1 and 2 and held in position therebetween by appropriate bolts, as clearly indicated in Fig. 1. Connected across the two legs 9 there is a bar or plate 11, this bar 11 is positioned to the forward of rails 1 and 2 and at its longitudinal center carries a bolt 12, which acts as a pivot for one end of a lever 13, the pivotal connection of the lever with the bolt being affected by means of a longitudinally disposed slot 14 through which the bolt 12 passes. The lever 13 is the means by which the stub axles are shifted on their pivots, and to provide for the successful operation of this lever, each upright leg 6 of the stub axles is provided with an arm 15 appropriately secured to the upper end of the leg and these two arms at their outer ends are interconnected by a connecting rod 16 whose ends pivotally connect with the ends of the arms. At an intermediate point in the length of this connecting rod, it is pivotally connected as indicated at 17, with the lever 13 and it is apparent that the swinging of this lever 13 on its pivot point 12 will serve to move the connecting rod 16 longitudinally in either direction depending on the direction in which the free end of the lever 13 is moved, this operation obviously rocking the arms 15 with the resultant shifting of the legs 6 and their stub axles 7 angularly with the legs 6 as pivots. In order that the lever 13 may be retained in any position to which it is shifted the upper edge of the rail 2 for a specified distance, is formed with the upstanding teeth 18 between any two of which there may engage the lug 19 carried by the underface of the lug. The lever is of sufficient length to permit it to extend a substantial distance to the rear of the frame and this rear or free end is formed with a handle 20 for convenient manipulation by hand by the operator of the machine who sits on a seat 21 carried by two spaced supports 22 having their ends secured to the underface of the bar 11. These supports 22 are secured on the underface of the bar 11 in any appropriate manner.

Since the bar 11 is fixed relative to the frame A and the connecting rod 16 is movable relative thereto, the provision of the slot 14 at the pivotal connection of the lever 13 is for the obvious purpose of permitting the connecting rod to be shifted without binding.

The connections between the tongue and the frame are braced by means of diagonally disposed bracing members 23, which have one end secured at the lower ends of the depending plates 3 on the inner faces thereof, and the remaining ends appropriately secured on the outside faces of the legs 9 of the tongue.

The two legs 9 adjacent their point of union with the tongue B are equipped each with a depending stirrup 24, which serve to support a transversely disposed bar 25, the latter projecting from opposite sides of the leg of the tongue and carrying adjacent its extremities the bolts 26 which pivotally engage the webs or transverse portions of inverted U-shaped members 27, the latter straddling the forward ends of the main hoe beams 28. Bolts 29 pass through the legs of these U-shaped members 27, and transversely through the beams and pivotally connect the beams to these U-shaped members, the bolts 29 lying in planes at right angles to the bolts 26. There is thus provided a pivotal connection between the forward ends of the beams 28 and the transverse bar 25. The pivotal connection permits up and down movement of the rear portions of the beams 28 and the raising and lowering of the ground-working elements carried thereby and the swinging of those portions laterally.

The beams 28, adjacent their rear ends carry the steps 30 which are designed for engagement by the feet of the operator to keep the rear ends of the beams down so that the ground working devices carried by the beams may be kept in engagement with the ground. At their rear extremities the beams 28 carry upstanding bars 31 which terminate in hand grips 32, the latter being in convenient reach of the operator on the seat 21, so that he may swing the beams 28 away from or toward him to provide for the distance desired, whereby the gangs of hoes may be conveniently spaced for the successful operation of the machine.

The vertical adjustment of the beams hereinbefore referred to is provided for by the placement on top of the extremities of the legs 9 of tooth segments 33 which are held on top of the legs by appropriate bolts, one of the bolts attaching each of these segments serving as the connecting medium between the legs 9 and the bar 10 of the frame A. Each segment 33 carries a pivotally mounted hand lever 34 equipped with a spring latch 35 engaging the teeth of the segment, so that the lever may be shifted to engage any desired teeth and locked in the position to which it is shifted. The pivots of the levers are in reality fulcrums since the levers are formed with arms 36 extending forwardly with reference to the machine as a whole. At the free ends of these arms chains 37 are connected, and these chains depending connect with the upper faces of the beams 28. Obviously, therefore, the shifting of the levers 35 on their fulcrums or pivots will operate to raise or lower the beams depending on the directions in which the levers are moved.

The beams 28 carry the hoes or ground engaging mediums with which the machine is equipped, these hoes comprising the body portion 41 and the wings of the ground engaging portions 39. These members are of conventional form and the specific construction need not be recited here. These hoes are arranged in gangs of two each, and to that end each of the beams 28 carries a relative short transverse beam 38 which is swingably mounted at 40 on the under side of the beam. At opposite ends of each beam 38 the body portions 41 of the two hoes comprising a pair are clamped, the clamping connection being indicated at 42. To relieve these clamping connections 42 from undue lateral strains, each body portion 41 has connected with it one end of a chain 43, the remaining ends of the chains 43 of each pair of hoes being connected with a hook member 44 carried by a bracket 45 mounted on the underface of the beam 28 of that pair of hoes. Each hook 44 is formed with a threaded shank with which a nut 46 is engaged for the obvious purpose of increasing or diminishing the tension on the chains 43.

To provide for the attachment of a suitable draft mechanism a transversely disposed bar 47 is employed, this bar resting on top of the two beams 28 and carrying two eye bolts 48 with each one of which there is engaged a link 49. Each link 49 has its remaining end connected with an eye 50 mounted at the upper face of one of the beams 28. Each link 49 is straddled by an inverted U-shaped member 51, which spans its attendant beam 28 and has its legs appropriately connected on opposite sides of the beam.

A doubletree 52 and a clevis 53 are connected to the bar 47 by a pivot-bolt 54 and a clevis 53, a bolt 54 securing the clevis in place as well as pivotally connecting the whiffle tree. Check chains 55 lead from the clevis 53 and connect with the bar 11 adjacent opposite sides thereof.

The doubletree 52 at opposite ends is equipped with swingletrees 56 to which the draft animals may be attached.

As the draft-animals are hitched to draft devices in relatively low position on the beams 28, there is practically direct application of the draft to the hoes, with the result that there is less downward pressure in the front portion of the tongue and on the draft-animals than if the draft were applied at a higher point.

As has been hereinbefore described, the beams 28 may be swung laterally or vertically or by manipulation of the levers 35 and the hand-grips 32. Further, the ground wheels may be angled for the purpose of steering or for the purpose of causing the hoes to follow a direct line when the machine is working on the incline, such as a hillside or the like.

From the foregoing description and the accompanying drawings, it is believed that a clear understanding of the invention is to be had.

The invention having been described, what is claimed as new and useful is:

A ground-working implement comprising a frame wheel supported at its rear, stirrups depending from the frame, a cross-bar carried by said stirrups, beams pivotally connected to and trailing behind said cross-bar, ground-working elements on said beams, a draft-bar on said beams, link connections between said draft-bar and each of said beams, a draft member pivotally mounted on said draft-bar, and a draft-connection extending rearwardly from said draft member to said frame.

In testimony whereof I affix my signature.

ROBERT R. SLIPP.